United States Patent Office 2,929,405
Patented Mar. 22, 1960

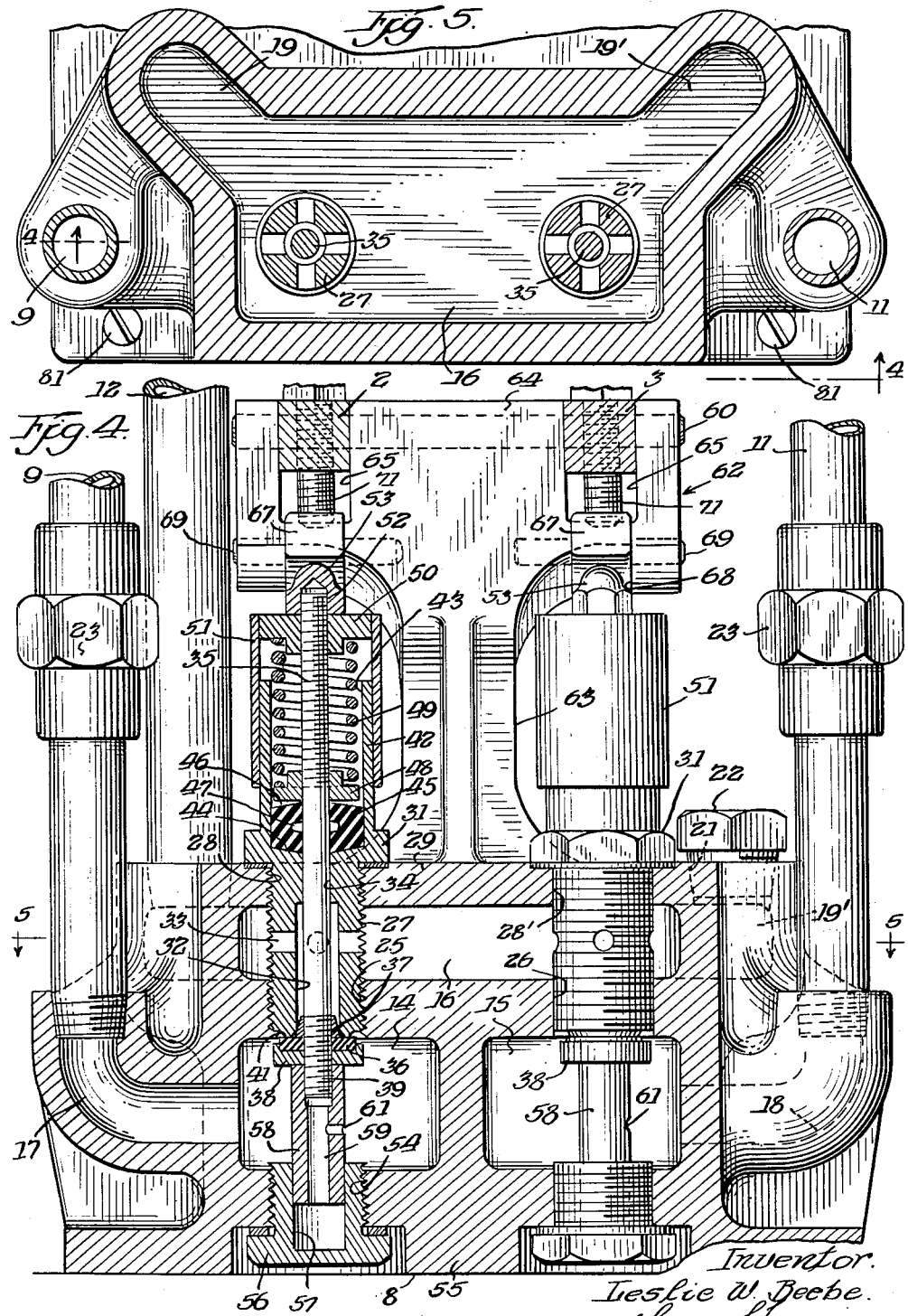

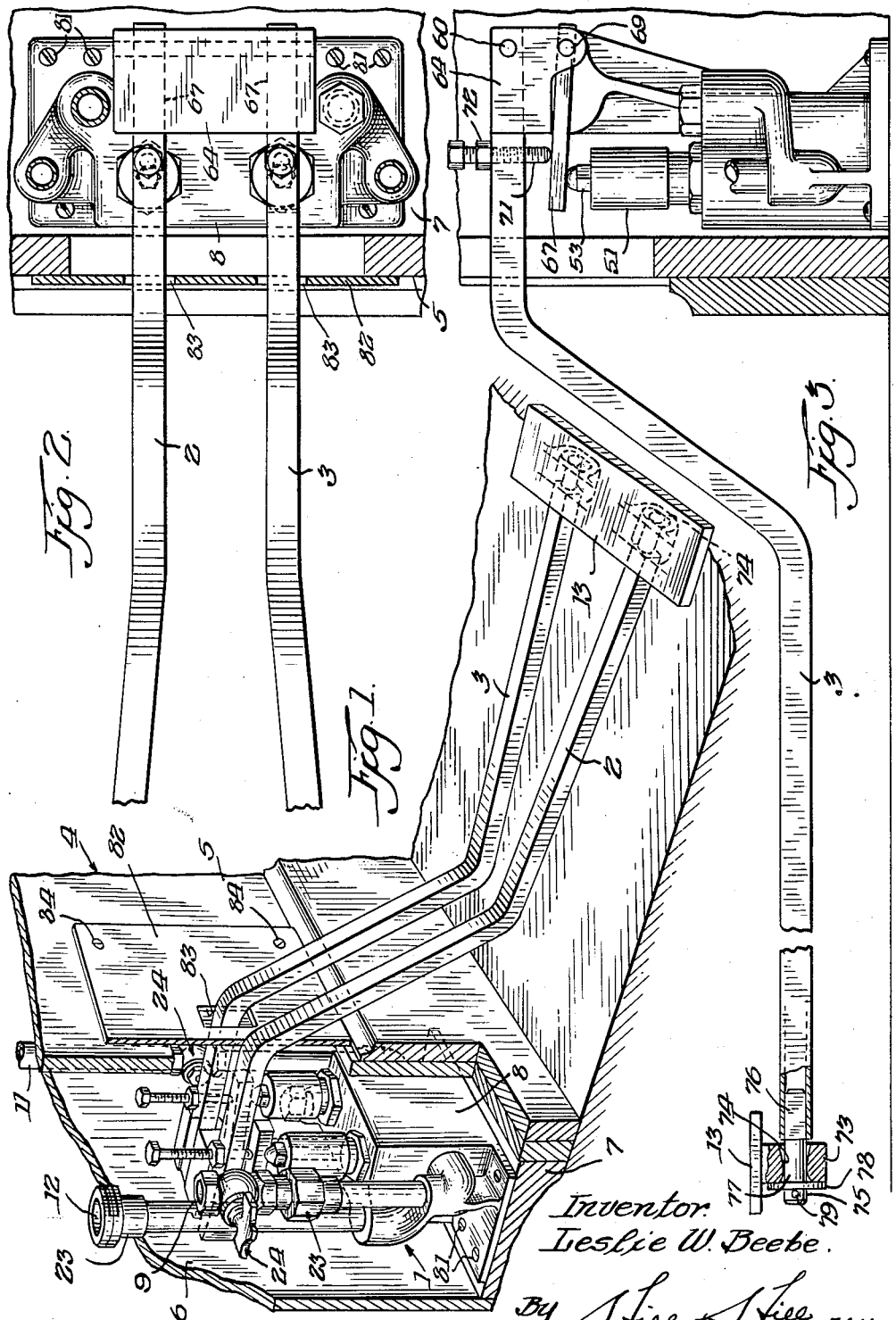

2,929,405

PEDAL ACTUATED MIXING VALVE

Leslie W. Beebe, Oak Park, Ill.

Application July 9, 1957, Serial No. 670,730

3 Claims. (Cl. 137—607)

The invention relates generally to foot-operated mixing valves or the like, and more particularly to a valve structure which may be operated by means of a single pedal or treadle.

The present invention is an improvement over valve structures of the type illustrated in my prior Patent No. 2,287,011, issued June 23, 1942, entitled, "Foot Operated Water Control," and has among its objects the production of a mixing valve structure which may be positioned within a partition or wall so that, with the exception of the actuating levers, the valve structure may be fully concealed, thus presenting a neat appearance and at the same time eliminating floor mounted fixtures which are dirt catchers and prevent effective cleaning of the floor with cleaning machines and the like, as well as eliminating costly chrome plated fixtures and piping.

Another object of the invention is the production of such a valve structure having simple adjustment means for varying the height of the actuating levers and treadle structure, and which is so designed that installation and servicing are simplified.

A further object of the invention is the production of such a valve structure which may utilize heavy spring elements to maintain the valve in closed relation, and which is provided with means for controlling the movement of the valve structure to prevent "water hammer" and sudden opening and closing movement of the valve.

Many other objects and advantages of the present invention will be obvious to those skilled in the art from the disclosure herein given.

To this end my invention consists in the novel construction, arrangement and combination of parts herein shown and described and more particularly pointed out in the appended claims.

In the drawings, wherein like reference characters indicate like or corresponding parts:

Fig. 1 is a perspective view illustrating the installation of a valve mechanism embodying the present invention in a wall structure;

Fig. 2 is a top plan view of the structure illustrated in Fig. 1;

Fig. 3 is a side elevational view of the structure;

Fig. 4 is a sectional view taken approximately on the line 4—4 of Fig. 5; and

Fig. 5 is a sectional view taken approximately on the line 5—5 of Fig. 4.

Referring to the drawings and more particularly to Fig. 1, the reference numeral 1 indicates generally a mixing valve structure having a pair of actuating levers 2 and 3 extending therefrom, the valve being designed to be positioned behind a wall structure indicated generally by the numeral 4, illustrated as comprising a pair of spaced substantially parallel wall members 5 and 6 which are separated by a wooden plate or sill 7 extending between the two wall members. The valve mechanism 1 includes a body member 8 adapted to be operatively connected to a pair of water supply lines 9 and 11, and is provided with an outlet line 12, the levers 2 and 3 being adapted to control the flow of liquid from the respective lines 9 and 11 into the valve mechanism and discharge therefrom to the line 12. Assuming that the lines 9 and 11 are connected to hot and cold water lines, respectively, in accordance with normal practice, both the temperature and volume of the water passing through the valve may be controlled. Thus, the entire valve mechanism may be positioned behind the wall 5 with only the levers 2 and 3 being exposed. To facilitate actuation of the levers 2 and 3, a treadle member 13 may be supported by the free ends of the levers, cooperable connections between the levers and the treadle being provided to permit free movement of either lever with respect to the other so that either a single lever may be actuated by pressure on the treadle adjacent the lever to be actuated, or both levers may be depressed by pressing on the portion of the treadle intermediate the two levers. Obviously, by varying the proportion or distribution of pressure applied to the treadle between the two levers, the ratio of hot to cold water and total volume thereof may be varied as desired.

Referring to Figs. 4 and 5, the body member 8 is provided with a pair of inlet chambers 14 and 15 which are arranged one along side of the other, and positioned above the chambers 14 and 15 is a mixing chamber 16. The chamber 14 may be operatively connected to the line 9 by a passage-way 17, and in like manner the chamber 15 may be operatively connected to the line 11 by a passage-way 18, each of which passage-ways may be suitably formed in the body member 8. In like manner, the mixing chamber 16 may be operatively connected to the discharge line 12 by a passage-way 19, the body 8 preferably being provided with a similar passage-way 19' located at the opposite side of the body member, having a discharge opening or bore 21 therein which is illustrated as being operatively closed by a plug 22. The design is such that the discharge line 12 therefor may be located at either side of the body member 8, thus facilitating installation of the valve structure and connection to a lavatory or other fixture with which the valve is to be employed. To facilitate installation and removal of the valve for servicing or the like, a union 23 may be interposed in each of the lines 9, 11 and 12, a cock 24 preferably being interposed in each of the lines 9 and 11 above the associated union 23 so that the inlet lines may be shut off by the cocks 24 and upon disconnection of the unions 23, the entire valve structure may be removed from the wall.

The body member 8 is provided with a bore 25 operatively connecting the chamber 14 with the chamber 16 and in like manner the chamber 15 is operatively connected with the mixing chamber 16 by a bore 26, suitable valve means being interposed between the chambers 14 and 15 and the chamber 16 to control the flow of fluid from the former to the latter. Each valve structure, in the embodiment illustrated, comprises a valve housing or member 27 which is threaded into the bore 25 and extends through a coaxial threaded bore 28 in the top wall 29 of the body member directly above the mixing chamber 16. The member 27 may be provided with a hex-shaped flange 31 or other structure by means of which the member 27 may be engaged with a suitable tool for assembling the same with the body member, a suitable sealing material being applied to the threads before assembly to insure fluid tight joints between all engageable elements.

The member 27 is provided with a fluid passageway 32 therein which communicates at its lower end with the chamber 14 and operatively communicates at its upper end with the mixing chamber 16 through one or more bores 33 in the member 27 extending transversely to the axis of the member and intersecting the bore 32. The member 27 is also provided with an axially extending bore 34 in which is slidably mounted a valve stem 35. Carried by the stem 35 adjacent the lower end thereof as viewed in Fig. 4, is a valve disc 36 supported between a conical-shaped member 37 and a retaining washer 38, both of which are threaded on the cooperable threaded portion 39 of the stem 35. The valve disc 36 is adapted to operatively engage a suitable annular-shaped valve seat 41 formed on the lower end of the member 27 as viewed in Fig. 4, the conical member 37 functioning to vary the effective area of the passage-way between the chamber 14 and chamber 16 as the disc 36 is moved toward or away from the seat 41. The upper end of the member 27 is generally tubular in shape, having a relatively thin side wall 42 forming a bore 43 open at its upper end and having a generally concave bottom wall 44 on which is seated a packing ring 45 constructed of neoprene or other suitable material and having a complementary bottom wall and convex upper wall 46, the ring 45 illustrated being provided with an annular-shaped recess 47 adjacent the stem 35. Slidably mounted on the stem 35 and seated upon the face 46 of the packing 45 is a guide collar 48 for compression spring 49 positioned in the chamber 43. Threaded on the upper end of the stem 35 is a guide cap 50 having a downwardly depending sleeve 51 concentric with the wall 42 of the member 27 and cooperable therewith to form guiding means for the upper end of the stem 35. The cap 50 may be locked in position on the stem by a cap nut 52 having a rounded top surface 53. Extending coaxial with the stem 35 and threaded into a bore 54 in the bottom wall 55 of the member 8 is a plug 56 having a cylindrical bore 57 therein extending coaxial with the stem 35 and adapted to receive a cylindrical member 58 threaded on the end 39 of the stem 35, the diameter of the member 58 being slightly smaller than the diameter of the bore 57 to provide a sliding fit, the member 58 having an axial bore 59 therein intersected by a transversely extending bore 61, which are cooperable to form a passage-way from the lower end of the chamber 57 to the chamber 14.

While the member 58 may function to guide the lower end of the stem 35, the structure functions to snub or impede sudden movements of the valve stem and associated structure. The member 58 and chamber 57 as well as the metering port 61 functioning as a dash pot or shock absorber, eliminating "water hammer" and the like. The use of the cone-shaped member 37 provides a smooth adjustment and control of the water over a comparatively long travel of the valve stem, giving a smooth easy action.

Referring to Figs. 2, 3 and 4, the actuating levers 2 and 3 are adapted to be pivotally supported by a vertically extending column or standard indicated generally by the numeral 62, comprising a centrally positioned column 63 provided with a transversely extending upper enlarged portion 64 having a pair of channels or grooves 65 therein, each of which is of a size to receive the adjacent end portion of one of the levers 2 or 3, as the case may be, the levers 2 and 3 being pivotally mounted on the portion 64 by suitable means such as a pin 60 which passes through the respective levers.

Referring to Figs. 2 and 4, it will be noted that each lever 2 or 3 is positioned directly above the cap member 53 of the associated valve structure and is operatively connected to the latter through an actuating lever 67 having its inner end pivotally supported on the standard 62, the latter being provided with slots 68 therein of a size to receive the inner end of the associated actuating lever which may be pivotally mounted on the standard by a pin 69, each lever 67 being illustrated as having its own retaining pin. The pins 60 and 69 may be retained in operative position by any suitable means as, for example, by constructing the parts as a press fit. Each lever 67 may be operatively connected to its associated lever 2 or 3 by adjustable means which, in the embodiment illustrated, comprises screws 71, each of which is threaded into a respective lever 2 or 3 and adapted to be locked in any position of adjustment by lock nuts 72. Thus, by varying the position of the screw 71 and the associated lever, the height of the free or treadle end thereof may be raised or lowered with respect to the floor surface. This construction provides ample adjustment for the levers 2 and 3, at the same time retaining a uniform valve actuation irrespective of such adjustment.

The treadle 13 is so connected to the levers 2 and 3 that by application of pressure at the proper point on the treadle either lever may be partially or fully actuated independently of the other lever or both may be simultaneously actuated in varying degrees, and in the construction illustrated the treadle 13 is provided with a pair of downwardly depending lugs or ears 73, each of which is provided with a more or less oval shaped bore 74 extending therethrough from front to rear and aligned with the free end portions of the respective levers. The latter are illustrated in the drawings as being constructed from square tubing and may be provided with respective terminal members 75, each of which comprises a rectangular shank portion 76 of a size to enter the open end of associated tubular lever and retained therein by suitable means, as for example, a press fit. Each member 75 is also provided with a cylindrical portion 77 of a size to extend through the associated bore 74 of the treadle, the latter being retained thereon by suitable means such as a washer 78 and retaining pin 79 passing through the portion 75.

Referring to Fig. 3, it will be noted that the top and bottom walls of each bore 74 are generally convex in cross-section to permit the treadle to rock forwardly and rearwardly on the repsective cylindrical portions 77 of the end fittings and with the elongated shape of the bores 74 provides free action between the treadle and the levers 2 and 3, irrespective of relative positions of the latter and thus eliminate any possibility of undesired interference therebetween which might result in rough or uneven actuation of the valve.

The valve may be readily installed, as illustrated in the drawings, by making an opening in the wall below the lavatory or other fixture on which the valve is to be employed, the opening preferably being just above the baseboard as illustrated, and of a size to allow room to actuate a wrench on the connections. Normally for a valve of the size illustrated, an opening of approximately ten inches by ten inches is adequate. The valve is then installed in position, mounting the body on the plate 7, by suitable means such as screws 81, following which the water supply pipes may be connected to the respective cocks 24 and the discharge pipe connected to the union 23 on the discharge line 12. The screws 71 may then be adjusted to properly position the levers 2 and 3 and treadle 13 at a suitable height above the floor to provide adequate valve operation, the screws being locked in their adjusted positions by their respective lock nuts 72. After the valve mounting has been completed, the installation may be finished by mounting a suitable cover plate 82 on the wall to conceal the opening therein, the plate 82 having a suitably shaped opening 83 therein for each lever 2 and 3, and being secured to the wall by suitable means, as for example, screws 84.

It will be appreciated that in view of the considerable leverage derived by the levers 2 and 3, the valve closing springs 49 may be quite stiff to provide exceptionally efficient sealing qualities on the valve disc 39 and packing 45. However, with the use of a comparatively heavy spring, it is particularly desirable to have suitable means for preventing sudden or sharp closings and openings of the valve structure which in the present instance is avoided by the use of the member 58 in conjunction with the chamber 57 for providing a retarding or impeding action to the valve stem and structure carried thereby.

It will also be noted that the utilization of a packing member such as the packing 45 in the shape illustrated and in conjunction with the use of a heavy spring results in very efficient sealing of the stem 35, at the same time permitting adequate movement of the latter with respect to the housing 27.

In the event it is desired to service the valve mechanism, following disconnection of the actuating levers associated therewith, the entire valve housing 27 may be removed from the body 8 and either repaired or replaced with an entirely new assembly, the latter being constructed so that they are interchangeable. In the event it is desired to replace the valve disc 36, the member 58 and retaining washer 41 may be readily removed from the threaded portion 39 of the stem and following removal of the old disc and installation of a new disc, the washer and member 58 may be replaced.

It will be noted from the above disclosure that I have provided a valve structure which may be fully concealed behind a wall or the like, only the operating levers being visible and providing access on the floor therebelow, the valve structure being very efficient for the purposes intended. Obviously, as the only visible members are the treadle 13, operating levers 2 and 3, and the closure plate 82, costly plating of other elements, as well as piping, is eliminated with a material reduction in cost. If desired, the plate may be painted to match the walls so that only the treadles and levers may be made with a bright finish.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. A foot actuated mixing valve comprising a body member having a pair of fluid inlet chambers and a mixing chamber therein, a pair of valve assemblies, each communicating with the mixing chamber and a respective inlet chamber, each of said assemblies having an end portion extending from the body member, said valve assemblies each comprising a generally tubular valve housing having a fluid passage therein operatively connecting the mixing chamber with a respective inlet chamber, a valve stem structure carried by said housing and having one end extending into the associated inlet chamber and the other end extending outwardly from the external end of a housing, the latter having a valve seat at its inner end positioned in the associated inlet chamber and encircling said passage-way, a valve disc adjacent to and cooperable with said valve seat carried by the valve stem, and operable to close the associated passage-way, a packing ring encircling the external portion of the valve stem, a collar encircling the valve stem and bearing on said packing ring, a second collar rigidly carried by said valve stem adjacent the external free end thereof, a relatively stiff compression spring encircling said valve stem and interposed between said collars operative to urge the valve stem in a direction to seat the valve disc on the valve seat and apply compression forces to said packing, said housing having a tubular-shaped outer end portion adapted to encircle said compression spring, and said second mentioned collar having a tubular portion extending concentric with the tubular portion of said housing, said valve stem having a generally conical portion adjacent said valve disc and positioned in said passage-way operative to vary the effective area of the latter as the valve stem and disc are moved in an opening direction, the inner end of the valve stem structure having a generally cylindrical portion movable in a cooperable bore in the base member, said cylindrical portion having a fluid passage-way therein operatively connecting the inner end of said bore with said inlet chamber, said last mentioned passage-way being of a size to impede the free flow of fluid between the inner end of said bore and said inlet chamber and control the movement of said stem, a pair of movable treadle levers carried by said body member, a treadle member operatively connecting the outer ends of said levers, a pair of valve actuating members carried by said body member, each engageable with a respective valve stem, and adjustable means operatively connecting each actuating member with a respective treadle lever.

2. A foot actuated mixing valve comprising a body member having a pair of fluid inlet chambers and a mixing chamber therein, a pair of valve assemblies, each communicating with the mixing chamber and a respective inlet chamber, each of said assemblies having an end portion extending from the body member, said valve assemblies each comprising a generally tubular valve body extending between the mixing chamber and one of the inlet chambers and having a fluid passage therein operatively connecting the mixing chamber with a respective inlet chamber, a valve stem structure carried by said body and having one end extending into the associated inlet chamber and the other end extending outwardly from the external end of the body, a valve means carried by the valve stem operable to close or open the associated passage-way, means operative to urge the valve stem in a direction to close the associated passage-way, a pair of movable treadle levers carried by said body member, a treadle member operatively connecting the outer ends of said levers, a pair of valve actuating members pivotally carried by said body member, each engageable with a respective valve stem, and means in threadedly assembled relation with each treadle lever projecting therefrom in bearing relation with one of said actuating members and threadedly adjustable while in said relation for positioning said treadle lever and operatively connecting the lever with said one actuating member.

3. A valve assembly for mixing valves and the like comprising a generally tubular valve body having a fluid passage therein, a valve stem structure carried by and extending through said body and including a valve stem, one end of said body having a valve seat thereon encircling said passageway, a valve disc adjacent to and cooperable with said valve seat carried by the valve stem adjacent the associated end of the latter, and operable to close the associated passageway, a packing ring encircling the valve stem adjacent the other end thereof, a collar encircling the valve stem and bearing on said packing ring, a second collar carried by said valve stem adjacent the external end thereof, a pair of concentric telescopic guide sleeves respectively carried by said tubular body and said second collar, means for maintaining said second collar in axially fixed relation with respect to said valve stem, a relatively stiff compression spring encircling said valve stem and interposed between said collars operative to urge the valve stem in a direction to seat the valve disc on the valve seat and apply compression forces to said packing ring, said valve stem having a generally conical portion adjacent said valve disc and positioned in said passageway operative to vary the effective area of the latter as the valve stem and disc are moved in an opening direction, the inner end of the valve stem structure having a generally cylindrical portion adapted to move in a cooperable bore in the valve member in which the assembly is to be used, said cylindrical portion having a fluid passageway therein adapted to operatively connect the inner end of such a bore with a chamber in which said valve disc may be positioned, said last-mentioned passageway being of a size to impede the free flow of fluid into and from the inner end of such a bore and control the movement of said stem.

References Cited in the file of this patent

UNITED STATES PATENTS

| | | |
|---|---|---|
| 361,400 | Quillfeldt | Apr. 19, 1887 |
| 468,926 | Bishop | Feb. 16, 1892 |
| 1,361,060 | Houser et al. | Dec. 7, 1920 |
| 1,460,931 | Yeiser et al. | July 3, 1923 |
| 1,562,979 | Muend | Nov. 24, 1925 |
| 1,627,020 | Dougherty | May 3, 1927 |
| 2,116,806 | Zinkil et al. | May 10, 1938 |
| 2,188,258 | Zinkil et al. | Jan. 23, 1940 |
| 2,287,011 | Beebe | June 23, 1942 |

FOREIGN PATENTS

| | | |
|---|---|---|
| 22,681 | Great Britain | of 1897 |